United States Patent
Shirouzu (10) Patent No.: US 12,523,275 B2
(45) Date of Patent: Jan. 13, 2026

(54) ECCENTRIC OSCILLATING GEAR DEVICE

(71) Applicant: SUMITOMO HEAVY INDUSTRIES, LTD., Tokyo (JP)

(72) Inventor: Kenji Shirouzu, Aichi (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 0 days.

(21) Appl. No.: 18/967,180

(22) Filed: Dec. 3, 2024

(65) Prior Publication Data
US 2025/0189014 A1    Jun. 12, 2025

(30) Foreign Application Priority Data
Dec. 6, 2023   (JP) .................................. 2023-206180

(51) Int. Cl.
*F16H 1/32* (2006.01)

(52) U.S. Cl.
CPC ............... *F16H 1/321* (2013.01); *F16H 1/32* (2013.01); *F16H 2001/323* (2013.01); *F16H 2001/325* (2013.01)

(58) Field of Classification Search
CPC ............ F16H 1/32; F16H 2001/325; F16H 2001/327; F16C 19/20; F16C 19/40
See application file for complete search history.

(56) References Cited

U.S. PATENT DOCUMENTS

| | | | | |
|---|---|---|---|---|
| 2,431,810 A * | 12/1947 | Knaak | ............... | F16C 33/3706 384/551 |
| 3,940,200 A * | 2/1976 | Schreffler | ............ | H01R 39/643 439/17 |
| 7,553,249 B2 * | 6/2009 | Nohara | ...................... | F16H 1/32 475/179 |
| 8,827,854 B2 * | 9/2014 | Nomura | ............... | B60K 17/356 475/170 |
| 10,295,032 B2 * | 5/2019 | Jin | ........................... | F16H 1/32 |
| 2005/0105838 A1 * | 5/2005 | Brauer | ............... | F16C 33/3713 384/492 |
| 2022/0325780 A1 * | 10/2022 | Kim | ........................ | F16H 1/32 |

FOREIGN PATENT DOCUMENTS

| | | | |
|---|---|---|---|
| CN | 110762169 B | | 5/2023 |
| FR | 971 246 A | | 1/1951 |
| GB | 752854 A | | 7/1956 |

(Continued)

OTHER PUBLICATIONS

Machine translation of JP H10-184693 (Maruyama) Jul. 14, 1998.*
Search Report issued in European Application No. 24215961.4-1009, mailed Apr. 7, 2025.

*Primary Examiner* — Sherry L Estremsky
(74) *Attorney, Agent, or Firm* — Michael Best & Friedrich LLP (57) ABSTRACT

An eccentric oscillating gear device includes: a crankshaft including an eccentric body; an oscillating gear oscillated by the eccentric body; and an eccentric bearing disposed between the oscillating gear and the eccentric body, in which the eccentric bearing includes a plurality of rolling elements, some rolling elements adjacent in a circumferential direction of the plurality of rolling elements are in contact with each other, and a spacer is disposed between some of the other rolling elements adjacent in the circumferential direction of the plurality of rolling elements.

15 Claims, 6 Drawing Sheets

(56) References Cited

FOREIGN PATENT DOCUMENTS

| | | | | |
|---|---|---|---|---|
| JP | H10184693 A | * | 7/1998 | |
| JP | 2007162920 A | * | 6/2007 | ............... F16C 19/40 |
| JP | 2007-182987 A | | 7/2007 | |
| JP | 2019-056478 A | | 4/2019 | |
| WO | WO-2011027675 A1 | * | 3/2011 | ............... F16H 1/32 |
| WO | WO-2012111412 A1 | * | 8/2012 | ........... B60K 17/046 |
| WO | WO-2018168762 A1 | * | 9/2018 | ............... F16H 1/32 |

* cited by examiner

ECCENTRIC OSCILLATING GEAR DEVICE

CROSS-REFERENCE TO RELATED APPLICATIONS

This application claims priority to Japanese Patent Application No. 2023-206180, filed on Dec. 6, 2023, which is incorporated by reference herein in its entirety.

BACKGROUND

Technical Field

A certain embodiment of the present invention relates to an eccentric oscillating gear device.

Description of Related Art

The related art discloses an eccentric oscillating gear device including a crankshaft including an eccentric body, an oscillating gear oscillated by the eccentric body, and an eccentric bearing disposed between the oscillating gear and the eccentric body.

SUMMARY

According to an embodiment of the present invention, there is provided an eccentric oscillating gear device including: a crankshaft including an eccentric body; an oscillating gear oscillated by the eccentric body; and an eccentric bearing disposed between the oscillating gear and the eccentric body, in which the eccentric bearing includes a plurality of rolling elements, some rolling elements adjacent in a circumferential direction of the plurality of rolling elements are in contact with each other, and a spacer is disposed between some of the other rolling elements adjacent in the circumferential direction of the plurality of rolling elements.

DETAILED DESCRIPTION

The present inventor has newly recognized the followings in an eccentric oscillating gear device. When an eccentric bearing has a full roller structure or the like, rolling elements adjacent to each other in the eccentric bearing are brought into contact with each other. In this case, when a gear device is operated, the rolling elements collide with each other to generate a collision sound.

Therefore, it is desirable to provide an eccentric oscillating gear device capable of reducing a collision sound of a rolling element.

Hereinafter, embodiments for implementing an eccentric oscillating gear device of the present disclosure will be described. The same or equivalent components will be denoted by the same reference numerals and the repeated description thereof will be omitted. In each drawing, the components are appropriately omitted, enlarged, or reduced for convenience of description. The drawings need to be viewed in accordance with a direction of the reference numerals.

First, a background of devising an eccentric oscillating gear device (hereinafter, simply referred to as a gear device) of the present disclosure will be described. The present inventor has newly recognized that, when each of rolling elements of an eccentric bearing has a full roller structure, during an operation of the gear device, the rolling elements collide with each other with a "click" sound, and thus, a collision sound is generated. The present inventor has studied a cause of the above, and has newly recognized the followings. The eccentric bearing having the full roller structure shows a specific behavior as follows.

Figure 1:
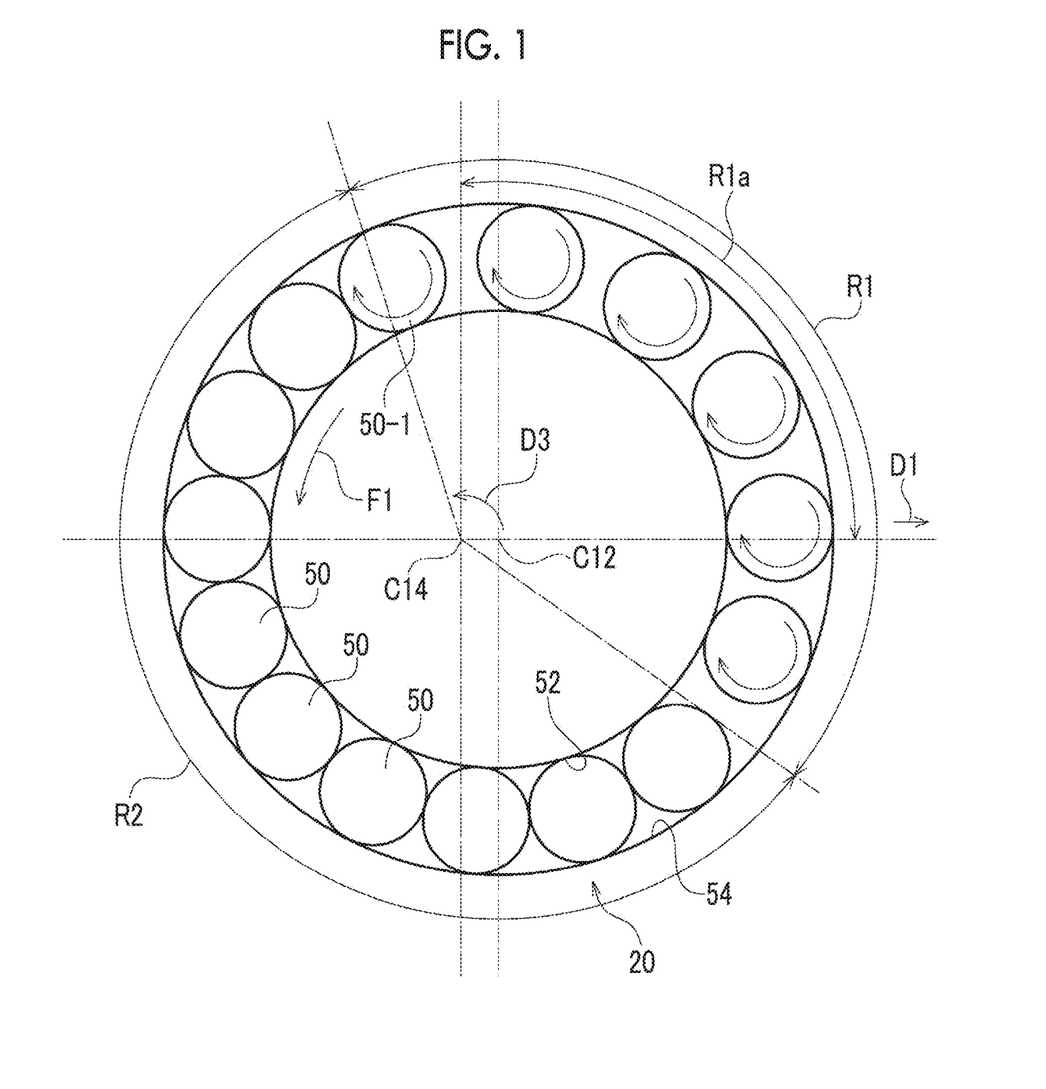
FIG. 1 is a diagram schematically illustrating a behavior of an eccentric bearing during an operation of a gear device.

FIG. 1 is a diagram for describing a behavior of the eccentric bearing during an operation of the eccentric oscillating gear device. Here, a case where rotation is input from a drive source to a crankshaft (to be described later) will be described as an example.

During the operation of the gear device, a load range R1 in which a load acts on a rolling element 50 and a no-load range R2 in which a load hardly or does not act on the rolling element are formed in an eccentric bearing 20. The load range R1 and the no-load range R2 are ranges formed depending on a type, a dimension, a reduction ratio, and the like of a gear device 10. The load range R1 and the no-load range R2 oscillate together with an eccentric body 12 in a process in which an axial center C12 of the eccentric body 12 oscillates around a rotation center line C14 of a crankshaft 14 in an oscillation direction D3, but a size of the range hardly fluctuates. The load range R1 usually includes an angle range R1a of 90° in the oscillation direction D3 from a semi-straight line extending from the rotation center line C14 of the crankshaft 14 in a maximum eccentric direction D1 (to be described later). In addition, the load range R1 usually has a start point in an angle range of −90° in a direction opposite to the oscillation direction D3 from the angle range R1a, and has an end point in an angle range of 90° in the oscillation direction D3 from the angle range R1a.

During the operation of the gear device, the rolling element 50 of the eccentric bearing 20 advances to alternately pass through the load range R1 and the no-load range R2. When, the rolling element 50 passes through the load range R1, a load acts on the rolling element 50 between an inner rolling contact surface 52 and an outer rolling contact surface 54. When the eccentric body 12 oscillates in this state, the rolling element 50 comes into rolling contact with both the inner rolling contact surface 52 and the outer rolling contact surface 54 without slipping, and advances in an eccentric body circumferential direction (to be described later) in conjunction with axial rotation. In this case, when rotation at a constant angular velocity is input to the crankshaft 14, the rolling element 50 advances at a substantially constant advancing speed.

In contrast, when the rolling element 50 passes through the no-load range R2, the load hardly or does not act on the rolling element 50 between the inner rolling contact surface 52 and the outer rolling contact surface 54. When the eccentric body 12 oscillates in this state, the rolling element 50 slides on the inner rolling contact surface 52 and the outer rolling contact surface 54 without coming into rolling contact. In this case, each rolling element 50 inside the no-load range R2 does not advance in conjunction with the axial rotation due to the rolling contact, and advances without the axial rotation in such a manner that the rolling element 50 is pushed in a direction F1 by a subsequent rolling element 50 (hereinafter, also referred to as a subsequent rolling element 50-1) that tries to move from the load range R1 to the no-load range R2. The rolling element 50 moved from the no-load range R2 to the load range R1 starts the rolling contact again to advance in the eccentric body circumferential direction.

Figure 2A:
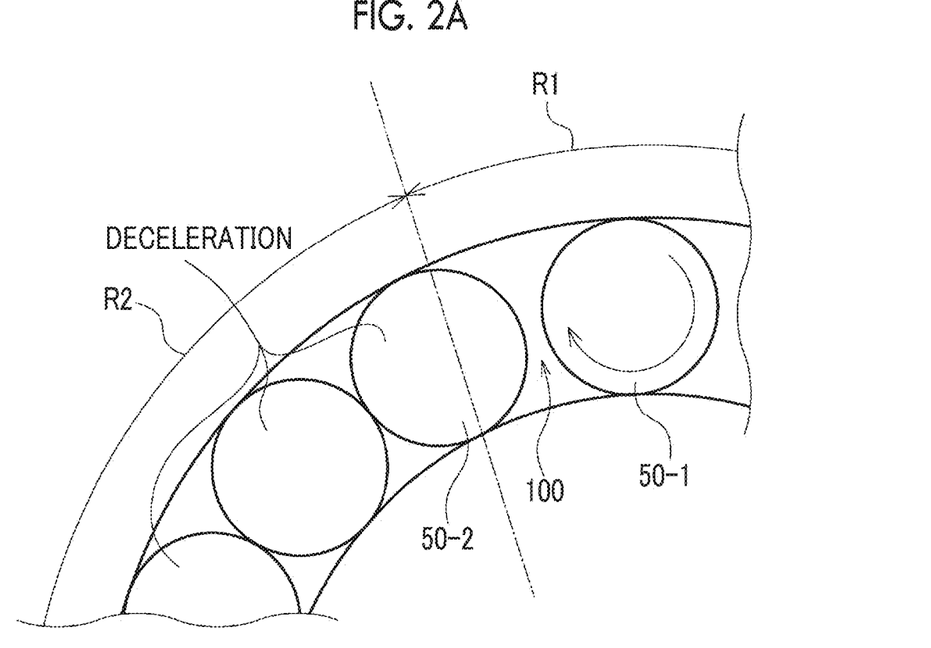
FIG. 2A is a first diagram for describing deceleration of a rolling element inside a no-load range.
Figure 2B:
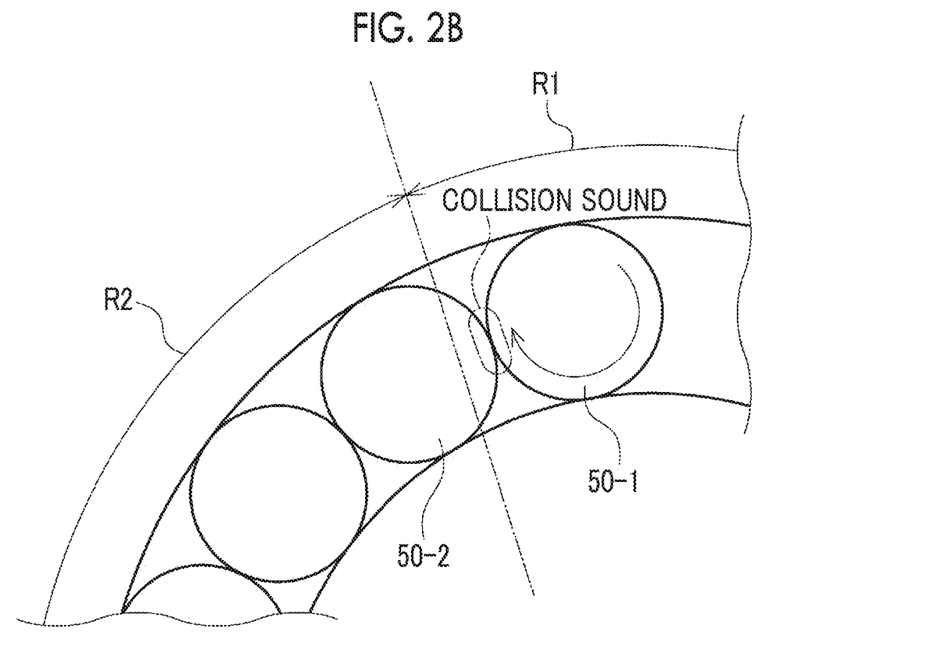
FIG. 2B is a second diagram for describing a collision sound of the rolling element.

Referring to FIGS. 2A and 2B, description will be continued. As described above, each of the rolling elements 50 inside the no-load range R2 advances in such a manner that the rolling element 50 is pushed by the subsequent rolling element 50-1 trying to move from the load range R1 to the no-load range R2. Therefore, even when a circumferential gap 100 (to be described later) of the eccentric bearing 20 is large as illustrated in FIG. 2A, a preceding rolling element 50 (hereinafter, also referred to as a preceding rolling element 50-2) immediately after moving to the no-load range R2 is temporarily brought into a state where the preceding rolling element 50-2 is not pushed by the rolling element 50 inside the load range R1. Therefore, each of the rolling elements 50 (including the preceding rolling element 50-2) inside the no-load range R2 is decelerated until the rolling element 50 inside the load range R1 starts to be pushed. When each of the rolling elements 50 inside the no-load range R2 is decelerated in this way, a speed difference in the eccentric body circumferential direction occurs in the rolling element 50 inside the load range R1. In a state where the speed difference occurs, as illustrated in FIG. 2B, when the subsequent rolling element 50-1 inside the load range R1 collides with the preceding rolling element 50-2 inside the no-load range R2, a collision sound is generated due to the collision.

The collision sound of the rolling element 50 occurs when the adjacent rolling elements 50 can be in contact with each other as in the full roller structure with regard to the eccentric bearing 20 having the load range R1 and the no-load range R2. The present inventor has recognized the followings. In reducing the collision sound of the rolling element, which occurs with the eccentric bearing in this way, it is effective to reduce the circumferential gap 100 of the eccentric bearing 20. In addition, the present inventor has recognized the followings. In reducing the circumferential gap 100 of the eccentric bearing 20 in this way, it is effective to dispose a spacer 62 (refer to FIG. 5) between some of the other adjacent rolling elements 50 while enabling some adjacent rolling elements 50 in the plurality of rolling elements 50 to be in contact with each other in the circumferential direction. Since the spacer 62 is disposed, the circumferential gap 100 of the eccentric bearing 20 can be reduced, compared to when the spacer 62 is not disposed. As the circumferential gap 100 is reduced, a time interval can be shortened from when the rolling element 50 moves to the no-load range R2 until the rolling element 50 starts to be pushed by the rolling element 50 inside the load range R1, and a deceleration degree of each of the rolling elements 50 inside the no-load range R2 can be reduced. As a result, it is possible to reduce a speed difference when the subsequent rolling element 50-1 inside the load range R1 collides with the preceding rolling element 50-2 inside the no-load range R2. Accordingly, the collision sound can be reduced. Hereinafter, details of the gear device 10 configured under this background will be described.

Figure 3:
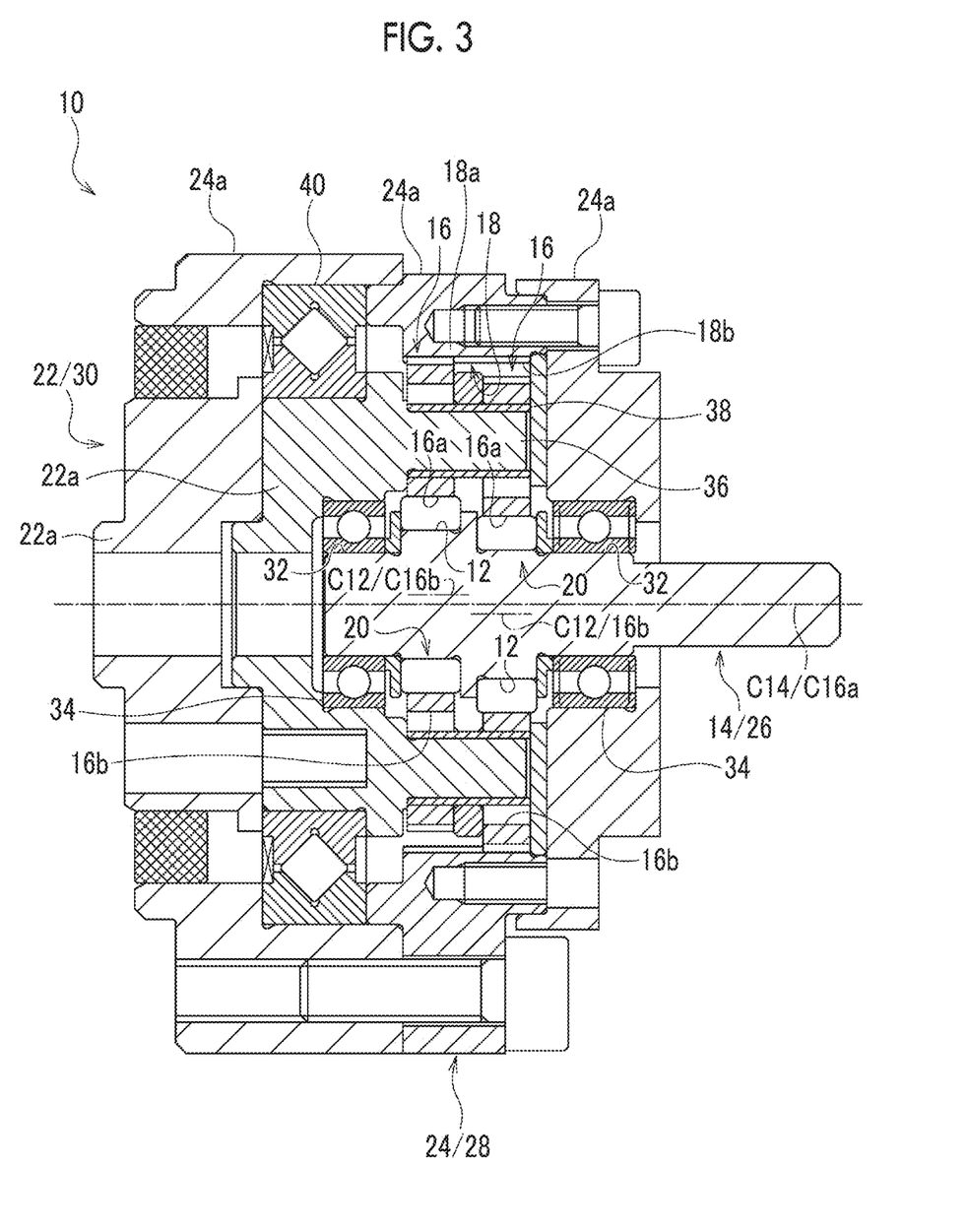
FIG. 3 is a sectional side view illustrating the gear device of an embodiment.

Referring to FIG. 3, description will be continued. The eccentric oscillating gear device 10 includes the crankshaft 14 having at least one eccentric body 12, an oscillating gear 16 oscillated by the eccentric body 12, a meshing gear 18 meshing with the oscillating gear 16, an eccentric bearing 20 disposed between the eccentric body 12 and the oscillating gear 16, a carrier 22 synchronized with an axial rotation component of the oscillating gear 16, and a casing 24 disposed outside the oscillating gear 16 in a radial direction. The gear device 10 of the present embodiment has one of main features in the eccentric bearing 20. A peripheral structure will be described first.

In the present embodiment, an eccentric oscillating gear device of a center crank type will be described as the gear device 10. In the gear device 10 of this type, the crankshaft 14 is disposed on an oscillation center $C16a$ of the oscillating gear 16. Hereinafter, a direction along the oscillation center $C16a$ of the oscillating gear 16 will be simply referred to as an axial direction, and a radius direction and a circumferential direction of a circle formed around the oscillation center $C16a$ will be simply referred to as the radial direction and the circumferential direction.

The gear device 10 includes an input member 26 to which rotation is input from a drive source (not illustrated), a fixing member 28 fixed to an external fixed member (not illustrated), and an output member 30 that outputs rotation to an external driven member (not illustrated). Here, an example in which the crankshaft 14 forms the input member 26, the casing 24 forms the fixing member 28, and the carrier 22 forms the output member 30 will be described. For example, the drive source is a motor, but may be a gear motor, an engine, and the like in addition to the motor. For example, the driven member is (1) an industrial machine such as a machine tool and a construction machine, (2) a robot such as an industrial robot and a service robot, (3) a transport machine such as a conveyor and a film transport device, and (4) a part of various machines such as a vehicle.

In addition to the eccentric body 12, the crankshaft 14 includes shaft bodies 32 provided on both sides of the eccentric body 12 in the axial direction. The crankshaft 14 is supported by a crankshaft bearing 34 disposed between the casing 24 or the carrier 22 and the shaft body 32. The eccentric body 12 and the shaft body 32 are provided by the same member, but may be provided as separate bodies.

The crankshaft 14 of the present embodiment includes two eccentric bodies 12 in total, but the number of the eccentric bodies is not particularly limited, and may be one, three, or more. The eccentric body 12 has a circular shape in which the axial center $C12$ of the eccentric body 12 is eccentric with respect to the rotation center line $C14$ of the crankshaft 14. The axial center $C12$ of the eccentric body 12 is a geometric center of a shape formed by an outer peripheral surface of the eccentric body 12 in a cross section perpendicular to the axial direction passing through the eccentric body 12. The eccentric body 12 enables the oscillating gear 16 to oscillate by rotating around the rotation center line $C14$ of the crankshaft 14. Here, the "oscillation" means that a gear center $C16b$ of the oscillating gear 16 rotates around the oscillation center $C16a$.

The eccentric bearing 20 is individually provided corresponding to each of the plurality of eccentric bodies 12, and rotatably supports the oscillating gear 16 corresponding to the eccentric body 12. Here, an example in which the oscillating gear 16 is an external gear and the meshing gear 18 is an internal gear will be described. The oscillating gear 16 is individually provided corresponding to each of the plurality of eccentric bodies 12. The oscillating gear 16 includes an eccentric bearing hole 16a in which the eccentric bearing 20 is disposed. The meshing gear 18 of the present embodiment is integrated with the casing 24. The meshing gear 18 includes a meshing gear body 18a and tooth portions 18b provided in a peripheral portion of the meshing gear body 18a and meshing with the oscillating gear 16. The tooth portion 18b of the present embodiment is integrated with the meshing gear body 18a. However, the tooth portion 18b may include a pin rotatably supported by the meshing gear body 18a.

The carrier 22 of the present embodiment is disposed only on one side in the axial direction with respect to the oscillating gear 16, but may be disposed on the other side in the axial direction. The carrier 22 of the present embodiment is configured by combining a plurality of (two in the present embodiment) carrier members 22a. A pin body 36 protrudes in the axial direction from the carrier 22. The pin body 36 penetrates a pin hole 16b provided in the oscillating gear 16. The pin body 36 of the present embodiment can receive a load from the oscillating gear 16 via a roller 38 into which the pin body 36 is inserted.

The carrier 22 can be synchronized with the axial rotation component of the oscillating gear 16 by the pin body 36 that penetrates the oscillating gear 16. Here, the description "synchronized with the axial rotation component" means that the axial rotation component of the carrier 22 is maintained to have the same magnitude as the axial rotation component of the oscillating gear 16 within a numerical range including zero. For example, when the carrier 22 is the output member 30, the oscillating gear 16 axially rotates, the axial rotation component of the oscillating gear 16 is transmitted to the carrier 22 via the pin body 36, and the carrier 22 rotates with the axial rotation component having the same magnitude as the axial rotation component of the oscillating gear 16. In this case, the carrier 22 axially rotates with the axial rotation component having the same magnitude as the axial rotation component of the oscillating gear 16. In this manner, the axial rotation component of the carrier 22 is synchronized with the axial rotation component of the oscillating gear 16. In contrast, when the carrier 22 is the fixing member 28, the axial rotation component of the carrier 22 is maintained at zero, and the rotation of the oscillating gear 16 is restrained by the carrier 22 and the pin body 36. In this manner, the axial rotation component of the oscillating gear 16 is also maintained at zero. As a result, the axial rotation component of the carrier 22 is synchronized with the axial rotation component of the oscillating gear 16.

The casing 24 of the present embodiment is configured by combining a plurality of (three in the present embodiment) casing members 24a. A main bearing 40 is disposed between the casing 24 and the carrier 22.

An operation of the above-described gear device 10 will be described. The crankshaft 14 is rotated by the rotation output from the drive source. When the crankshaft 14 is rotated, the oscillating gear 16 is oscillated by the eccentric body 12. When the oscillating gear 16 oscillates, a meshing position between the oscillating gear 16 and the meshing gear 18 is changed in the circumferential direction. As a result, each time the crankshaft 14 rotates once, one of the oscillating gear 16 and the meshing gear 18 (here, the oscillating gear 16) axially rotates by a difference in the number of teeth between the oscillating gear 16 and the meshing gear 18, and the axial rotation component is transmitted to the output member 30. In this case, the axial rotation component decelerated than the rotation of the crankshaft 14 by a reduction ratio corresponding to the difference in the number of teeth between the oscillating gear 16 and the meshing gear 18 is transmitted to the output member 30. The axial rotation component is output from the output member 30 to the driven member.

Figure 4:
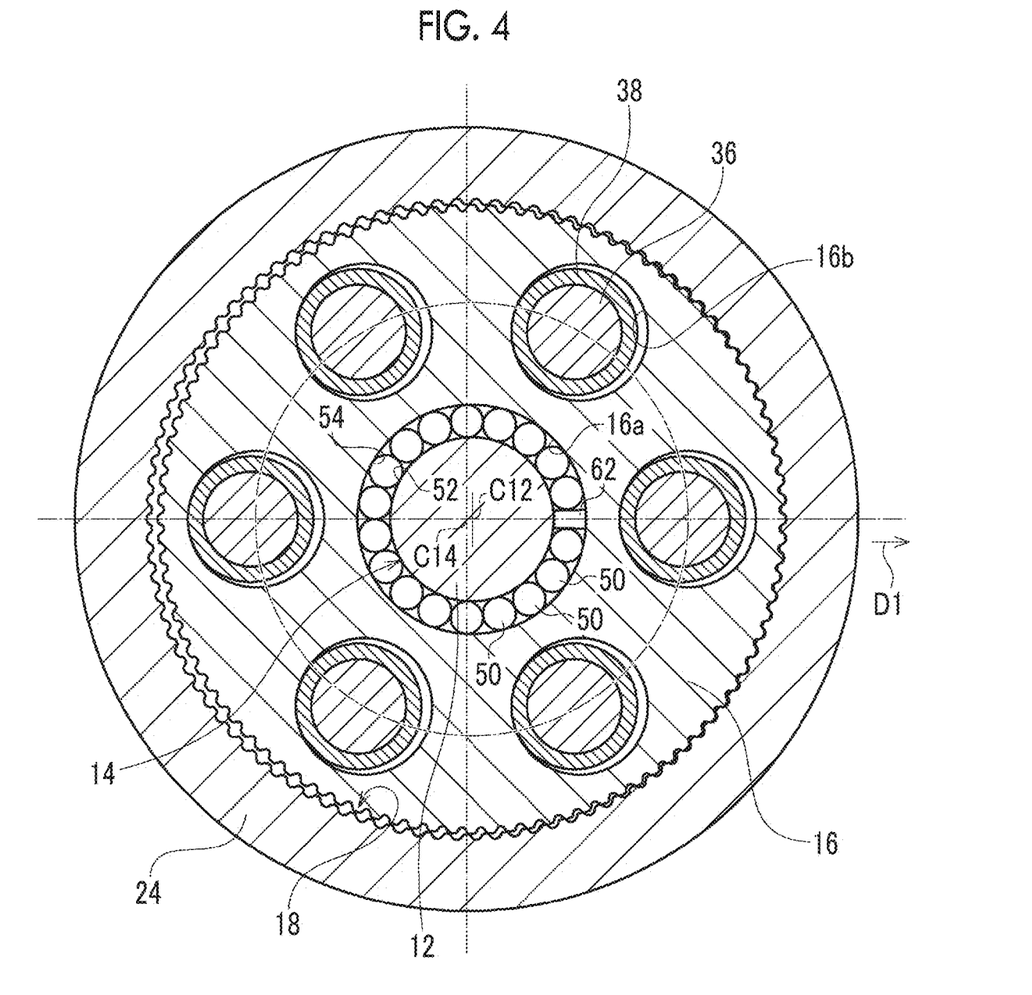
FIG. 4 is a sectional view when the eccentric bearing of the embodiment is viewed together with a peripheral structure in an axial direction.

Referring to FIG. 4, description will be continued. FIG. 4 illustrates a state where a rotation phase of the crankshaft 14 is different from that in FIG. 3. On a semi-straight line extending from the rotation center line C14 of the crankshaft 14 and passing through the axial center C12 of the eccentric body 12, a direction from the rotation center line C14 toward the axial center C12 will be referred to as a maximum eccentric direction D1. In addition, a circumferential direction of a circle formed around the axial center C12 of the eccentric body 12 will be referred to as an eccentric body circumferential direction.

The eccentric bearing 20 includes a plurality of rolling elements 50, an inner rolling contact surface 52 provided on a radially inner side of the rolling element 50 and on which the rolling element 50 rolls, and an outer rolling contact surface 54 provided on a radially outer side of the rolling element 50 and on which the rolling element 50 rolls.

The rolling element 50 of the present embodiment is a roller in which the axial rotation center line is parallel to the rotation center line C14 of the crankshaft 14. In addition, the rolling element 50 may be various rolling elements such as a sphere.

The eccentric body 12 also serves as an inner ring of the eccentric bearing 20 of the present embodiment, and an outer peripheral surface of the eccentric body 12 is provided with the inner rolling contact surface 52. In addition, the eccentric bearing 20 may include a dedicated inner ring, and the inner ring of the eccentric bearing 20 may be provided with the inner rolling contact surface 52.

The oscillating gear 16 also serves as an outer ring of the eccentric bearing 20 of the present embodiment, and the outer rolling contact surface 54 is provided in the eccentric bearing hole 16a. In addition, the eccentric bearing 20 may include a dedicated outer ring, and the outer ring of the eccentric bearing 20 may be provided with the outer rolling contact surface 54.

Figure 5:
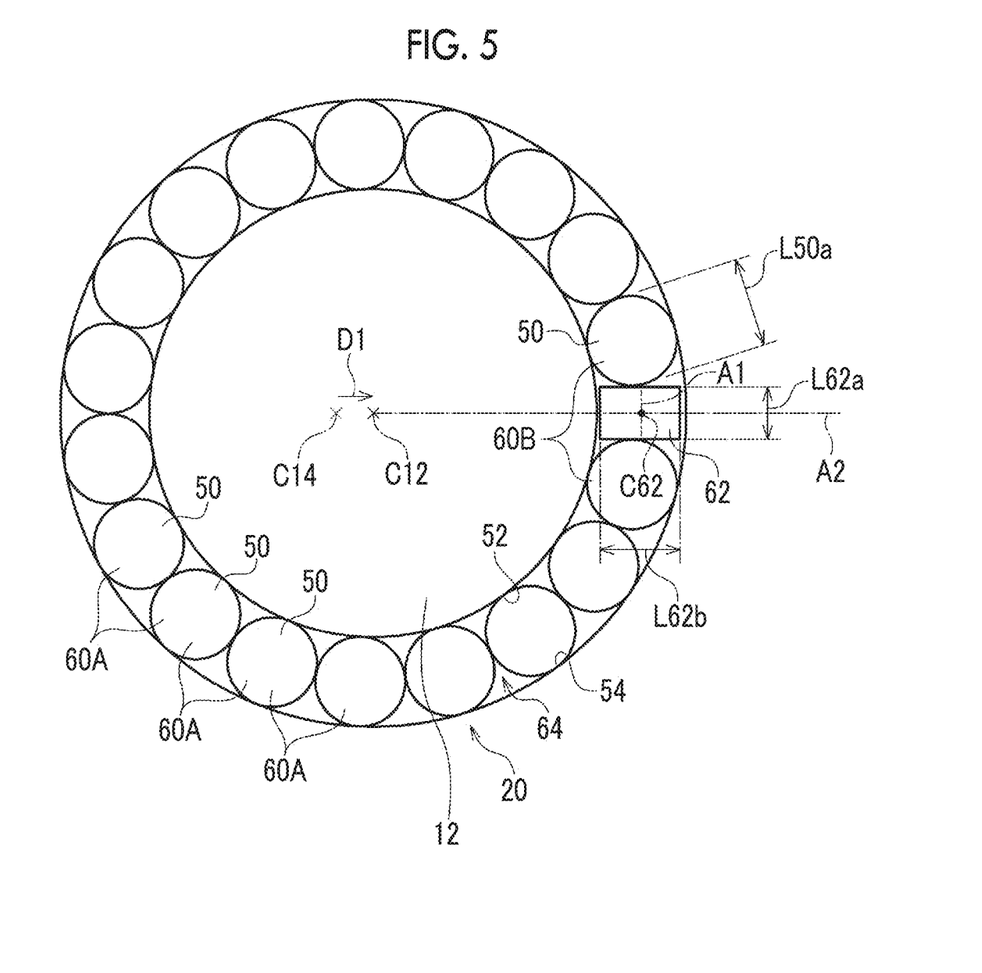
FIG. 5 is an enlarged view of the eccentric bearing in FIG. 4.

Referring to FIG. 5, description will be continued. A combination of the rolling elements 50 adjacent to each other in the eccentric body circumferential direction will be referred to as rolling element sets 60A and 60B. The rolling element sets 60A and 60B include two rolling elements 50 adjacent to each other in the eccentric body circumferential direction. The plurality of rolling elements 50 form a plurality of sets of rolling element sets 60A and 60B having the same number of the rolling elements 50. One rolling element 50 is duplicated between the two rolling element sets 60A and 60B. That is, one rolling element 50 is combined with the other rolling element 50 adjacent to the one side in the eccentric body circumferential direction to form one rolling element sets 60A and 60B, and is combined with the other rolling element 50 adjacent to the other side in the eccentric body circumferential direction to form the other rolling element sets 60A and 60B.

The eccentric bearing 20 of the present embodiment does not include a retainer that holds a gap between the adjacent rolling elements 50. The retainer usually includes an annular portion disposed in the axial direction with respect to the plurality of rolling elements 50, and a plurality of gap holding portions protruding in the axial direction from the annular portion and holding the gap between the adjacent rolling elements 50. The retainer usually includes the same number of the gap holding portions as the number of the plurality of rolling elements 50, and each of the plurality of gap holding portions is disposed between the rolling elements 50 of each of the plurality of rolling element sets 60A and 60B.

Some rolling elements 50 adjacent to each other in the circumferential direction in the plurality of rolling elements 50 can come into contact with each other. The spacer 62 is disposed between some of the other rolling elements 50 adjacent to each other in the circumferential direction in the plurality of rolling elements 50. From another viewpoint, a plurality of sets of rolling element sets 60A and 60B include the first rolling element set 60A in which the rolling elements 50 adjacent to each other in the circumferential direction are in contact with each other and the second rolling element set 60B in which the spacer 62 is disposed between the rolling elements 50 adjacent to each other in the circumferential direction. From the viewpoint of increasing a rolling element filling rate, it is desirable that a ratio of the number of sets of the first rolling element set 60A to the total number of sets of the rolling element sets 60A and 60B is higher. The rolling element filling rate here refers to a ratio in which the total number of rolling elements 50 forming the eccentric bearing 20 occupies a rolling element disposition space 64 in which the rolling elements 50 are disposed in the eccentric bearing 20. From this viewpoint, for example, it is preferable that the number of sets of the first rolling element set 60A is equal to or larger than half of the total number of sets of the rolling element sets 60A and 60B, is equal to or larger than (total number of sets—2), and is (total number of sets—1) in this order. For example, it is preferable that the number of sets of the second rolling element set 60B is smaller than half of the total number of sets, 2 or smaller, and 1 in this order. Here, an example in which the number of sets of the first rolling element set 60A is (total number of sets—1) and the number of sets of the second rolling element set 60B is 1 will be described.

The spacer 62 is used to reduce the circumferential gap 100 of the eccentric bearing 20, compared to a case where the spacer 62 is not provided. The "circumferential gap" here refers to a gap existing between movable members in at least one combination of adjacent movable members in a plurality of the movable members disposed in the circumferential direction in the above-described rolling element disposition space 64, and allowing rattling of the plurality of movable members in the circumferential direction. The "movable member" here includes the spacer 62 in addition to the plurality of rolling elements 50.

A tangential dimension L62a of the spacer 62 will be studied. The tangential dimension L62a here refers a dimension in a tangential direction of the eccentric body 12, and specifically, refers a dimension in the tangential direction along a tangent line A1 of a circle formed around the axial center C12 of the eccentric body 12 and passing through an outer shape center C62 which is a geometric center of an outer shape of the spacer 62 in a cross section perpendicular to the axial direction passing through the eccentric bearing 20. The tangential dimension fluctuates since the spacer 62 rotates around the outer shape center C62 depending on a shape of the spacer 62. Therefore, the tangential dimension L62a of the spacer 62 is set based on when the spacer 62 is located at a rotation position around the outer shape center C50 where the tangential dimension is smallest.

A radial dimension L62b of the spacer 62 will be studied. The radial dimension L62b here refers to a dimension in the radial direction along a radius line A2 of a circle formed around the axial center C12 of the eccentric body 12 and passing through the outer shape center C62 of the spacer 62 in a cross section perpendicular to the axial direction passing through the eccentric bearing 20. The radial dimension L62b of the spacer 62 is also set based on when the spacer 62 is located at the rotation position around the outer shape center C50 where the tangential dimension L62a of the spacer 62 is smallest. The spacer 62 of the present embodiment has a plate shape provided so that a thickness direction is aligned in the tangential direction, when the spacer 62 is located at the rotation position where the tangential dimension L62a is smallest. The tangential dimension L62a of the spacer 62 is a dimension in the thickness direction, and the radial dimension L62b is a dimension in the width direction of the plate formed by the spacer 62.

In this case, preferably, the tangential dimension L62a of the spacer 62 is smaller than a diameter L50a of the rolling element 50. In a case where the rolling element 50 is a roller, the diameter L50a of the rolling element 50 here refers to the diameter of the rolling element 50 when viewed in a direction along an axial rotation center line of the roller, and in a case where the rolling element 50 is a sphere, the diameter L50a refers to the diameter of the sphere. In this manner, it is advantageous in increasing the rolling element filling rate, compared to when the tangential dimension L62a of the spacer 62 is equal to or larger than the diameter L50a of the rolling element 50. In addition, when the spacer 62 passes through the above-described load range R1, the spacer 62 cannot receive the load. Therefore, the load is dispersed and received by the other rolling element 50 passing through the load range R1. In this case, as the tangential dimension L62a of the spacer 62 is smaller, it becomes easier to increase the number of rolling elements 50 existing inside the load range R1. As a result, the load received by the plurality of rolling elements 50 existing inside the load range R1 can be reduced, and it is advantageous in securing strength of the rolling element 50. A lower limit value of the tangential dimension L62a of the spacer 62 is not particularly limited, and for example, may be 0.1 mm in view of facilitating real manufacturing, or may be more preferably 0.5 mm in view of further facilitating the manufacturing.

The radial dimension L62b of the spacer 62 is preferably larger than the tangential dimension L62a of the spacer 62. In this manner, compared when the radial dimension L62b of the spacer 62 is equal to or smaller than the tangential dimension L62a of the spacer 62, the spacer 62 is less likely to rotate around the outer shape center C62 of the spacer 62 when viewed in the axial direction. As a result, since the rotation of the spacer 62 is suppressed, stability is improved in causing the spacer 62 to advance in the eccentric body circumferential direction. The radial dimension L62b of the spacer 62 may be preferably a size smaller than the diameter L50a of the rolling element 50 from the viewpoint of suppressing sliding of the eccentric bearing 20 on each of the rolling contact surfaces 52 and 54.

The spacer 62 can be come into line contact with the rolling element 50. A contact range between the spacer 62 and the rolling element 50 forms a linear shape extending in the axial direction. For example, in order to realize this configuration, the rolling element 50 includes a roller such as a cylindrical roller, and for example, the spacer 62 includes a plate material or the like instead of the sphere. In this manner, compared to when the spacer 62 and the rolling element 50 are in point contact with each other, a contact surface pressure acting on a contact location between the spacer 62 and the rolling element 50 when the spacer 62 and the rolling element 50 collide with each other can be reduced, and it is advantageous in securing the strength of the spacer 62.

The spacer 62 preferably includes a material having a smaller Young's modulus (MPa) than the rolling element 50. In this manner, the spacer 62 can be softened, compared to the rolling element 50. In this manner, when the subsequent rolling element 50-1 collides with the preceding rolling element 50-2 as described above, an impact load generated by the collision can be alleviated by the spacer 62, and it is advantageous for securing the strength of the eccentric bearing 20. In order to realize this configuration, the rolling element 50 may be made of a metal-based material, and the spacer 62 may be made of a resin-based material. As the metal-based material, in addition to an iron-based material such as bearing steel, an aluminum-based material such as an aluminum alloy may be adopted. As the resin-based material, in addition to a general-purpose engineering plastic including a nylon-based resin such as PA46, a plastic-based material such as a special engineering plastic may be adopted. In addition to metal (including an alloy) serving as a main material, the metal-based material may be formed of a composite material of another material such as fiber and the main material. In addition to the resin serving as the main material, the resin-based material may be formed of a composite material of another material such as fiber and the main material.

The eccentric bearing 20 is in an environment where the eccentric bearing 20 is easily heated to a high temperature due to influence of heat or the like generated by meshing between the oscillating gear 16 and the meshing gear 18. Therefore, the spacer 62 may be formed of a material having a heat-resistant temperature which can withstand the high temperature even when the spacer 62 is heated to the high temperature. For example, as the heat-resistant temperature, the spacer 62 may be formed of a material having a heat-resistant temperature of 100° C. or higher. In this case as well, any of the above-described metal-based material and the resin-based material may be adopted.

The spacer 62 advances in the eccentric body circumferential direction by being pushed by another subsequent rolling elements 50 without rolling on the rolling contact surface of the eccentric bearing 20 during the operation of the gear device 10, and. Here, the "during the operation of the gear device 10" means when the crankshaft 14 rotates. It also means that the spacer 62 advances in the eccentric body circumferential direction without causing the spacer 62 to repeatedly rotate in the same direction around the outer shape center C62 when viewed in the axial direction. This configuration is satisfied even when the spacer 62 is located in any of the load range R1 and the no-load range R2. Even when being in contact with the rolling contact surfaces 52 and 54 of the eccentric bearing 20, the spacer 62 advances in the eccentric body circumferential direction while being in slide contact without coming into rolling contact.

Figure 6:
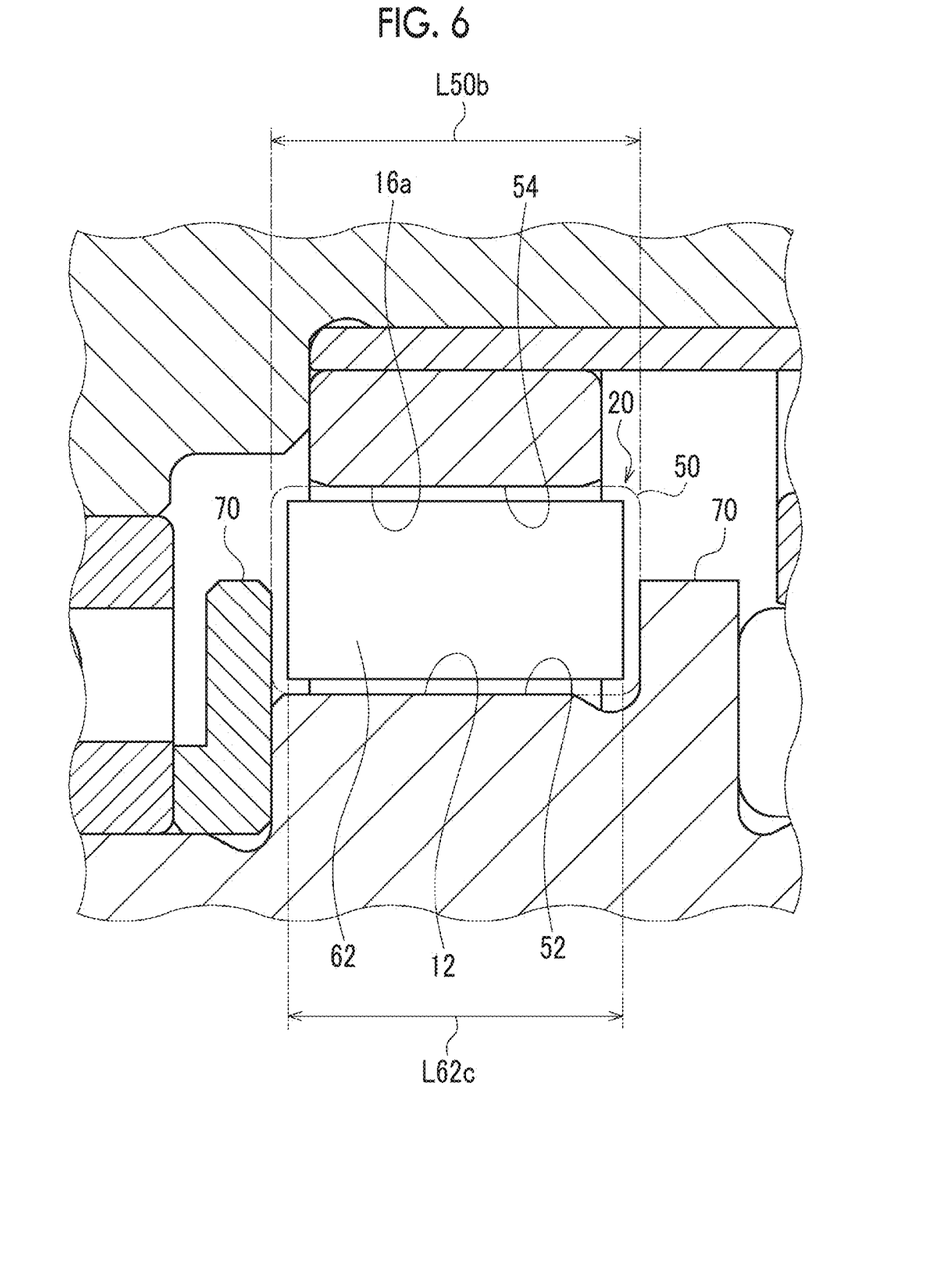
FIG. 6 is an enlarged view of a part in FIG. 3.

Referring to FIG. 6, description will be continued. FIG. 6 illustrates a different state from FIG. 3 in a phase of each of the rolling elements 50 of the eccentric bearing 20 around the axial center C12. The gear device 10 includes a pair of restricting parts 70 that restrict the axial movement of the plurality of rolling elements 50. The pair of restricting parts 70 are provided to correspond to each of the plurality of eccentric bearings 20. One of the pair of restricting parts 70 in the present embodiment is provided separately from the crankshaft 14, and the other one of the pair of restricting parts 70 is integrally provided with the crankshaft 14 by the same member.

The axial dimension L62c of the spacer 62 may be smaller than the axial dimension L50b of the rolling element 50. In this manner, it is advantageous in avoiding sliding with respect to the pair of restricting parts 70 that restrict the axial movement of the rolling element 50.

Advantageous effects of the above-described gear device 10 will be described. The spacer 62 is disposed between some adjacent rolling elements 50 of the plurality of rolling elements 50. Therefore, as described above, the collision sound of the rolling element 50 can be reduced.

In addition, some adjacent rolling elements 50 in the plurality of rolling elements 50 can come into contact with each other in the circumferential direction. Therefore, the following advantages are obtained. In the eccentric bearing, a retainer is usually incorporated to hold a gap between the adjacent rolling elements 50. The retainer includes a gap holding portion that holds the gap between the adjacent rolling elements 50. When the radial dimension of the gear device 10 is reduced, the thickness dimension of the gap holding portion of the retainer is reduced together with the radial dimension of the retainer. However, there is a manufacturing limit even in a case of reducing the thickness dimension of the gap holding portion of the retainer. Therefore, when the radial dimension of the gear device 10 is reduced to some extent, it is necessary for the gap holding portion of the retainer to secure a constant thickness dimension, and the number of rolling elements has to be reduced. When the rolling element filling rate is lowered by reducing the number of the rolling elements in this way, the strength of the eccentric bearing 20 is degraded. That is, reducing the radial dimension of the gear device 10 and the strength of the eccentric bearing 20 are in a trade-off relationship.

In this regard, according to the present embodiment, some adjacent rolling elements 50 can be in contact with each other in the circumferential direction. Therefore, when the radial dimension of the gear device 10 is reduced, the rolling element filling rate of the eccentric bearing 20 can be increased, compared to when the retainer is used, and it is advantageous in improving the strength of the eccentric bearing 20. In particular, it is advantageous in that reducing the radial dimension of the gear device 10 and the strength of the eccentric bearing which are in the trade-off relationship can be compatibly achieved. From the viewpoint of reducing the radial dimension of the gear device 10, the inner diameter (radial dimension of the circle formed around the axial center C12 of the eccentric body 12) of the outer rolling contact surface 54 of the eccentric bearing 20 may be 50 mm or smaller, for example.

In the eccentric oscillating gear device 10, in some cases, a plurality of types of rolling elements 50 having different outer diameters may be prepared, and an internal gap of the eccentric bearing 20 in the radial direction may be adjusted by adjusting the diameter L50a of the rolling element 50 when the gear device 10 is assembled. The reason that the internal gap in the radial direction is adjusted in this way is as follows. Various performances such as the strength, a lost motion, and efficiency of the gear device 10 are greatly affected by the internal gap in the radial direction. However, even when the internal gap in the radial direction is adjusted in this way, it is difficult to adjust the circumferential gap 100 of the eccentric bearing 20. The gear device 10 of the present embodiment is particularly effective in that the circumferential gap 100 which is less likely to be adjusted in this way can be adjusted by the spacer 62. In adjusting the circumferential gap 100 in this way, the number of the spacers 62 disposed between the adjacent rolling elements 50 in the second rolling element set 60B is not particularly limited. As in the embodiment, only a single spacer 62 may be disposed between the rolling elements 50, or a plurality of the spacers 62 may be disposed.

When the spacer 62 rolls, the spacer 62 rotates around the outer shape center C62 when viewed in the axial direction. Therefore, depending on the shape of the spacer 62, the actual tangential dimension of the spacer 62 is greatly changed by the rotation position around the outer shape center C62. Here, for example, description "depending on the shape of the spacer 62" means a case where the tangential dimension L62a and the radial dimension L62b of the spacer 62 are different as described above. In this regard, the spacer 62 of the present embodiment advances in the eccentric body circumferential direction by being pushed by the other rolling element 50 without rolling on the rolling contact surface. Therefore, regardless of the shape of the spacer 62, the actual tangential dimension of the spacer 62 is less likely to be greatly changed, and fluctuations in the circumferential gap of the eccentric bearing 20 adjusted by the spacer 62 are easily suppressed. As a result, an advantageous effect in which the collision sound is reduced by the spacer 62 can be stably obtained regardless of the shape of the spacer 62.

Next, modification forms of the respective components described so far will be described.

A specific type of the gear device 10 is not particularly limited. For example, the gear device 10 may be a distribution type in which a plurality of the crankshafts 14 are disposed at positions offset in the radial direction with respect to the oscillation center C16a of the oscillating gear 16.

The output member 30 may be the casing 24 instead of the carrier 22. The oscillating gear 16 may be an internal gear, and the meshing gear 18 may be an external gear.

An example in which the gear device 10 serves as a speed reducer has been described. In addition, the gear device 10 may be a speed increaser. In this case, the carrier 22 and the casing 24 may be the input members, and the crankshaft 14 may be the output member.

The tangential dimension L62a of the spacer 62 may be the same as the diameter L50a of the rolling element 50, or may be larger than the diameter L50a. The radial dimension L62b of the spacer 62 may be equal to or smaller than the tangential dimension L62a of the spacer 62. The spacer 62 may include the sphere that rolls on the rolling contact surfaces 52 and 54 of the eccentric bearing 20 during the operation of the gear device 10. A material of the spacer 62 is not particularly limited, and the spacer 62 may be formed of a material having a higher Young's modulus than the rolling element 50. The spacer 62 may be formed of the metal-based material in addition to the resin-based material.

The above-described embodiments and modification forms are examples. Technical ideas obtained by abstracting the embodiments and the modification forms should not be construed as limited to the contents of the embodiments and the modification forms. Many design changes such as modifications, additions, and deletions of the components can be made in the contents of the embodiments and the modification forms. In the above-described embodiments, the contents enabling the design changes are emphasized by assigning the notation of the "present forms". However, the design changes are allowed even when there is no notation in the contents. A hatched cross section in the drawing does not limit a material of a hatched object. The components including a single member in the embodiments may include a plurality of members. Similarly, the components including a plurality of members in the embodiments may include a single member.

It should be understood that the invention is not limited to the above-described embodiment, but may be modified into various forms on the basis of the spirit of the invention. Additionally, the modifications are included in the scope of the invention.

What is claimed is:

1. An eccentric oscillating gear device comprising:
   a crankshaft including an eccentric body;
   an oscillating gear oscillated by the eccentric body; and
   an eccentric bearing disposed between the oscillating gear and the eccentric body,
   wherein the eccentric bearing includes a plurality of rolling elements,
   some rolling elements adjacent in a circumferential direction of the plurality of rolling elements are in contact with each other, and a spacer is disposed between some of the other rolling elements adjacent in the circumferential direction of the plurality of rolling element, and
   when a dimension in an axial direction of the eccentric body is defined as an axial dimension, an axial dimension of the spacer is smaller than an axial dimension of the rolling element.

2. The eccentric oscillating gear device according to claim 1, further comprising:
   a carrier synchronized with an axial rotation component of the oscillating gear; and
   a casing disposed outside the oscillating gear in a radial direction.

3. The eccentric oscillating gear device according to claim 1,
   wherein the eccentric body has a substantially circular shape in which an axial center of the eccentric body is eccentric with respect to a rotation center line of the crankshaft.

4. The eccentric oscillating gear device according to claim 3,
   wherein the axial center of the eccentric body is a geometric center of a shape formed by an outer peripheral surface of the eccentric body in a cross section perpendicular to the axial direction passing through the eccentric body.

5. The eccentric oscillating gear device according to claim 1,
   wherein the crankshaft includes a shaft body provided on both sides of the eccentric body in the axial direction, in addition to the eccentric body.

6. The eccentric oscillating gear device according to claim 5,
   wherein the crankshaft is supported by a crankshaft bearing disposed between a casing or a carrier and the shaft body.

7. The eccentric oscillating gear device according to claim 1,
   wherein the oscillating gear is individually provided corresponding to each of the eccentric body and one or more eccentric bodies.

8. The eccentric oscillating gear device according to claim 7,
   wherein the oscillating gear includes an eccentric bearing hole in which the eccentric bearing is disposed.

9. The eccentric oscillating gear device according to claim 1,
   wherein when a dimension in a tangential direction of the eccentric body is defined as a tangential dimension, a tangential dimension of the spacer is smaller than a diameter of the rolling element.

10. The eccentric oscillating gear device according to claim 9,
wherein when a dimension in a radial direction of the eccentric body is defined as a radial dimension, a radial dimension of the spacer is larger than the tangential dimension of the spacer.

11. The eccentric oscillating gear device according to claim 1,
wherein when the gear device is operated, the spacer is pushed by the rolling element to advance in an eccentric body circumferential direction without rolling on a rolling contact surface of the eccentric bearing.

12. The eccentric oscillating gear device according to claim 1,
wherein the spacer is made of a material having a smaller Young's modulus than the rolling element.

13. The eccentric oscillating gear device according to claim 1,
wherein when a dimension in a radial direction of the eccentric body is defined as a radial dimension, a radial dimension of the spacer is larger than a radius of the rolling element.

14. The eccentric oscillating gear device according to claim 1,
wherein when the plurality of rolling elements and the spacer are referred to as movable members, a circumferential gap exists between adjacent movable members in a case where the plurality of rolling elements and the spacer are all arranged, and
when the spacer is viewed in the axial direction of the eccentric body, contact surfaces of the spacer with the rolling elements have shapes parallel to one direction.

15. The eccentric oscillating gear device according to claim 14,
wherein the spacer has a rectangular parallelepiped shape when viewed in the axial direction of the eccentric body.

* * * * *